United States Patent
Patrice

(10) Patent No.: US 8,644,880 B2
(45) Date of Patent: Feb. 4, 2014

(54) RADIOFREQUENCY LOCAL COMMUNICATION INTERFACE BETWEEN A MOBILE PHONE AND A CONTACTLESS READER

(75) Inventor: Philippe Patrice, Marseilles (FR)

(73) Assignee: Smart Packaging Solutions (SPS), Rousset (FR)

( * ) Notice: Subject to any disclaimer, the term of this patent is extended or adjusted under 35 U.S.C. 154(b) by 145 days.

(21) Appl. No.: 12/520,461

(22) PCT Filed: Dec. 20, 2007

(86) PCT No.: PCT/FR2007/002129
§ 371 (c)(1),
(2), (4) Date: Jun. 19, 2009

(87) PCT Pub. No.: WO2008/096059
PCT Pub. Date: Aug. 14, 2008

(65) Prior Publication Data
US 2010/0022273 A1    Jan. 28, 2010

(30) Foreign Application Priority Data
Dec. 20, 2006 (FR) ..................... 06 11190

(51) Int. Cl.
*H04B 5/00* (2006.01)
*H04B 7/00* (2006.01)
*H04M 1/00* (2006.01)
*H04B 1/38* (2006.01)

(52) U.S. Cl.
USPC ... 455/556.1; 455/41.1; 455/41.2; 455/550.1; 455/558

(58) Field of Classification Search
USPC .......... 455/556.1, 557, 558, 406, 426.1, 41.2, 455/550.1
See application file for complete search history.

(56) References Cited

U.S. PATENT DOCUMENTS

| | | | |
|---|---|---|---|
| 5,987,325 A * | 11/1999 | Tayloe | 455/435.2 |
| 2003/0090388 A1 | 5/2003 | Pomes | |
| 2004/0065734 A1* | 4/2004 | Piikivi | 235/451 |
| 2005/0125093 A1* | 6/2005 | Kikuchi et al. | 700/213 |
| 2005/0274803 A1 | 12/2005 | Lee | |

(Continued)

FOREIGN PATENT DOCUMENTS

| | | |
|---|---|---|
| EP | 1 315 116 | 5/2003 |
| EP | 1 732 238 | 12/2006 |
| WO | WO 2005/055459 A1 | 6/2005 |

OTHER PUBLICATIONS

Form PCT/ISA/210 (International Search Report) dated Jul. 23, 2008.

*Primary Examiner* — Marisol Figueroa
*Assistant Examiner* — Erica Navar
(74) *Attorney, Agent, or Firm* — Buchanan Ingersoll & Rooney PC

(57) ABSTRACT

A contactless smart card imbedded in a communication mobile substrate connected to a wireless communication network, and a contactless smart card reader in the vicinity of the communication mobile substrate for radiofrequency communication with the contactless smart card, are disclosed. On one hand, a first antenna is provided on the contactless smart card imbedded in the communication mobile substrate and, on the other hand, a second antenna is attached to the communication mobile substrate and connected by inductive coupling to the first antenna, so that the contactless smart card can directly communicate by radiofrequency with the contactless smart card reader without using the wireless communication network.

5 Claims, 2 Drawing Sheets

(56) References Cited

U.S. PATENT DOCUMENTS

| | | |
|---|---|---|
| 2006/0208899 A1* | 9/2006 | Suzuki et al. .............. 340/572.7 |
| 2006/0219776 A1 | 10/2006 | Finn |
| 2007/0004456 A1* | 1/2007 | Shimada ....................... 455/558 |
| 2008/0116264 A1* | 5/2008 | Hammad et al. .............. 235/382 |
| 2009/0088077 A1* | 4/2009 | Brown et al. ................. 455/41.2 |

* cited by examiner

RADIOFREQUENCY LOCAL COMMUNICATION INTERFACE BETWEEN A MOBILE PHONE AND A CONTACTLESS READER

The invention relates to a communication interface between a contactless smart card integrated in a communication mobile substrate, and an external reader positioned in the vicinity of the communication mobile substrate and intended to communicate by radio frequency with said contactless smart card. The invention also relates to a communication mobile substrate provided with a communication interface such as described hereinunder.

The invention more particularly applies to the case where the communication mobile substrate is a mobile telephone, and it will be described in greater details within this scope and as an example, without the example being limitative in any way. As a matter of fact, the invention is liable to be applied to other communicating portable objects provided with a smart card, such as PDAs ("Personal Digital Assistants"), or other ones.

Mobile telephones have recently known a wide success on the international scale, so that billions of persons always have their mobile telephones with them. In this context, the mobile telephone seems to be more and more a hardware and software platform, whereon other applications than the mobile telephone application through the GSM network or an equivalent could be used. Thus, the mobile telephone operators already provide all kinds of additional applications which are independent of the telephone application, such as for example games, a digital camera, a file reader of the mp3 type and other entertainment applications.

Some of the additional applications used today, such as the management of the organizer or the digital camera, use the memory of the smart card of the SIM type or the additional memory located in other types of smart cards intended for this purpose to store thereon the application data, which contributes to the fact that cards have always increasing memory capacities, of several hundreds of megabytes or even more.

However, in the present applications hosted by the mobile telephones, the SIM card interacts with the mobile telephone using electric contacts positioned on the SIM card and the mobile telephone interacts with the cell telephone network, in particular under the GSM standard, using an antenna positioned on the mobile telephone, thus enabling to communicate on long distances, through the mobile telephone cellular network.

However, considering the generalization of the mobile telephone as an application platform beyond the telephone applications, new needs have arisen for non telephone applications, possibly loaded on the smart card of the mobile telephone, which can locally communicate by radio frequency with a contactless reader positioned in the vicinity of the mobile telephone or, more generally, of the communication mobile substrate. As a matter of fact, some applications hosted in the smart card of the SIM type or in cards of different formats, inserted in the mobile telephone such as, in a non limitative way, a "SD card", a "mini SD card", a Multi Media Card also called "MMC card", could take advantage of a direct radio frequency communication with a contactless card reader positioned in the environment of the mobile telephone or, more generally, of the communication mobile substrate. The applications for the contactless payment smart cards or the applications for the physical access control using such smart cards used as identifiers, are examples of applications which could further enhance the range of applications provided by a mobile telephone or a communication mobile substrate provided with only one smart card.

In these new contactless applications which are proximity applications in so far as the card needs to interact through a contactless coupling with a card reader which is also operated without contact, it is necessary to set up a direct communication, in particular of the radio frequency type, between the smart card reader external to the telephone or to the communication mobile substrate and the smart card without using the cell telephone network.

Now in the mobile telephones according to the present state of the art, the smart card of the SIM type is in general inserted into a recess provided with contacts, so that the electric contacts of the mobile telephone come in contact with the matching contacts of the SIM card. Neither the SIM card, nor the mobile telephone according to the present state of the art, are provided with means for a contactless communication with a card reader located outside the mobile telephone, which make impossible the contactless communication of another application than that of the telephone, with a contactless reader positioned in the vicinity of the mobile telephone. This is all the more so since the mobile telephone is a rather dense device, provided with various electronic circuits such as a screen and a keypad, and a battery most often made of lithium, which is an obstacle to a direct communication of the radio frequency type between a radio frequency communication component positioned in the mobile telephone, and a radio frequency communication reader positioned in the vicinity of the mobile telephone.

The aim of the invention is thus to remedy these drawbacks and to provide a radio frequency interface device making it possible to set up a direct communication between a smart card operating without a contact, and inserted in a communication mobile substrate such as a mobile telephone, and a contactless reader positioned outside the mobile telephone, in spite of the electromagnetic interferences generated by the components of the mobile telephone.

Another aim of the invention is to provide a contactless communication interface enabling a contactless communication between an application hosted in a smart card, independently of the mobile telephone application hosted in the mobile telephone or the SIM card.

Another aim of the invention is to provide a particularly simple and not expensive interface device making it possible to adapt to many mobile telephones.

For this purpose, the aim of the invention is to provide a communication interface between a contactless smart card integrated in a communication mobile substrate connected to a wireless communication network, and a contactless smart card reader located in the vicinity of the communication mobile substrate and intended to communicate by radio frequency with said contactless smart card, characterised in that it includes, on the one hand, a first antenna positioned on the contactless smart card integrated in a communication mobile substrate, and, on the other hand a second antenna integral with the communication mobile substrate and connected through an inductive coupling to said first antenna, so that said contactless smart card can communicate directly by radio frequency with the contactless smart card reader without using the wireless telecommunication network.

Thanks to this communication interface, one application, more particularly for a payment or an access control, which is executed in the contactless smart card of the communication mobile substrate, can directly communicate with an external contactless smart card reader, reinforced by that of the second antenna, by mutual inductance. It should be noted that this direct communication is set up independently of the telephone communication between the communication mobile substrate and the telecommunication network.

In an advantageous embodiment of the invention, the contactless smart card is a double communication interface SIM card, having, on the one hand, electric contacts connected to matching contacts located in the communication mobile substrate, and having, on the other hand, an antenna able to communicate through an inductive coupling with said second antenna integral with the communication mobile substrate, which is made up of a mobile telephone compatible with the GSM standard or an equivalent.

In an advantageous embodiment, the second antenna is positioned on the body of the mobile telephone so as to face the first antenna positioned on the SIM card, so as to obtain the best possible inductive coupling between the small antenna on the contactless smart card, and the second antenna which can preferably be of larger dimensions in order to increase the range of the signal.

The aim of the invention is also to provide a mobile telephone and, more generally, a communication mobile substrate or device provided with a communication interface as mentioned hereabove.

In an advantageous embodiment of the communication mobile substrate, the latter further includes a slot and a receptacle for the introduction of a second contactless smart card, said second contactless smart card being positioned in the electromagnetic field of the second antenna and being able to receive and to execute an application programme involving a communication with a contactless reader through the second antenna. In this embodiment, it is not necessary for the SIM card to have an antenna since the additional contactless applications are hosted on the second smart card, and they also are exchangeable, through the exchange of said second smart card, and thus of the application programmes available to the user. The communication mobile substrate can thus be configured for receiving a double communication interface SIM card, having, on the one hand, electric contacts connected to matching contacts located in the communication mobile substrate, and having, on the other hand, an antenna able to communicate through an inductive coupling with said second antenna integral with the communication mobile substrate.

As an example, the application programme is a contactless programme for the payment of a service or a benefit, so that the communication substrate is able to make both mobile telephone transactions, using the SIM card and the mobile telecommunication network, and payment transactions using the second contactless smart card and the external smart card reader.

In another simplified embodiment of the invention, the communication mobile substrate includes no SIM card nor a mobile telephone function, but simply a double communication interface SIM card, i.e. a contact interface connected to the internal electronics of the communication mobile substrate so that the user can store his/her data in the memory of the smart card, and a contactless interface making it possible to exchange data with a proximate external reader.

Other characteristics and advantages of the invention will appear upon reading the detailed description and referring to the appended drawings wherein.

Figure 1:
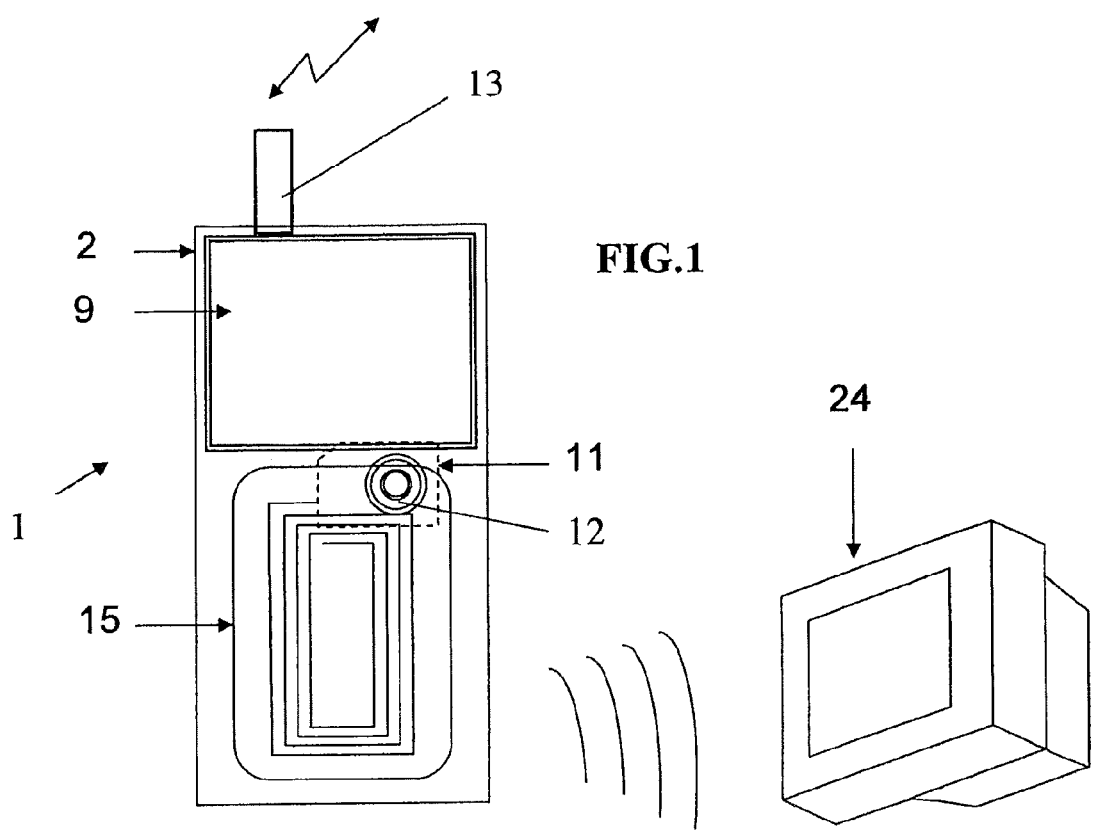
FIG. 1 illustrates in a plane view a first embodiment of the communication interface and the communication mobile substrate according to the invention.

We are now referring to FIG. 1. In this Figure, a communication mobile substrate 1 is schematically represented, for example in the form of a mobile telephone compatible with the GSM standard or an equivalent. The mobile telephone 1 is provided with a body 2 which typically carries a screen and a keypad (not shown), various electronic circuits known in the state of the art, as well as a battery 9 which is intended to supply the assembly. The communication mobile substrate 1 also carries a smart cart 11 of the SIM type used for identifying the user of the communication mobile substrate with the mobile telecommunication network used, which is accessible through the antenna 13.

In the state of the art, such a communication mobile substrate can communicate with only one or several wireless telecommunication networks, through the antenna 13, but it cannot make other types of wireless transactions with a contactless smart card reader 24 which would be located in the vicinity of the communication mobile substrate and which would include application software for making local wireless transactions (such as, for example, wireless payment applications) with a corresponding application software, loaded in the communication mobile substrate 1 or in the SIM card 11.

In order to enable the execution of such wireless local transactions without having to set up a communication of the wireless telephone type with the external contactless smart card reader 24, the invention provides the communication mobile substrate 1 with another radio frequency communication interface, making it possible to directly set up a radio frequency communication between a smart card 11 located in the communication mobile substrate 1, and the external contactless smart card reader 24. Thus, non telephone transactions can be executed between the communication mobile substrate 1 provided with a radio frequency communication interface, and one or several external device(s) 24 able to communicate without contact and preferably through radio frequency, with the mobile communication interface of the communication mobile substrate.

In practice, provided the required application programmes, for example payment or access control software, are loaded in an appropriate storage of the communication mobile substrate 1, it will be possible to execute payment or access control transactions between the communication mobile substrate and an external contactless terminal 24, independently of the mobile telephone programme loaded in the communication mobile substrate. This also implies that several independent applications, such as mobile telephone and payment applications can co-exist within the communication mobile substrate, without the mobile telephone operator and the payment operator (in the selected application) having to interact.

Of course, the respective dimensions of the antennas 12 and 15 to reach the desired communication range, as well as the geometry of the antennas to minimize the electromagnetic interferences of the other components of the communication mobile substrate, are within the skills of the persons skilled in the art.

Figure 2:
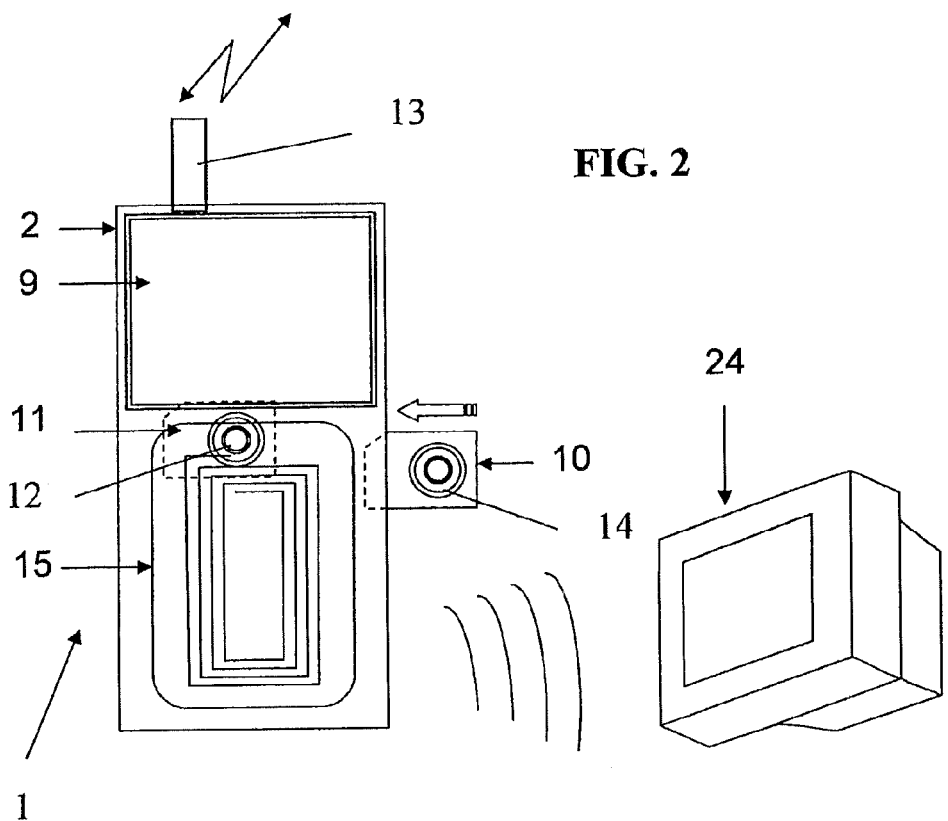
FIG. 2 illustrates a second embodiment of the communication interface and the communication mobile substrate according to the invention.

Reference is now made to FIG. 2. In this Figure is shown a communication mobile substrate 1, as a mobile telephone, conventionally carrying a SIM card 11. The SIM card 11 can be of the double communication interface SIM card type and include an antenna 12, or be of the contact communication type, only. When the SIM card 11 is of the contact type, the invention aims at providing the communication mobile substrate with another smart card 10, of the following formats: a SIM card, a SD card, a MMC card, or any other appropriate card format, provided this second card 10 carries an application software, more particularly of the payment type, intended to interact with the external contactless terminal 24 software, through a local radio frequency connection. For this purpose, the second smart card 10 carries an antenna 14 and is placed in the communication mobile substrate 1, so that the electronic elements (the battery 9) are not obstacles for the electromagnetic flux to this antenna. Preferably, the communication mobile substrate 1 includes another antenna 15, of larger dimensions, which ensures the amplification of the electromagnetic flux covered by the smaller antenna 14, through an inductive coupling.

Figure 3:
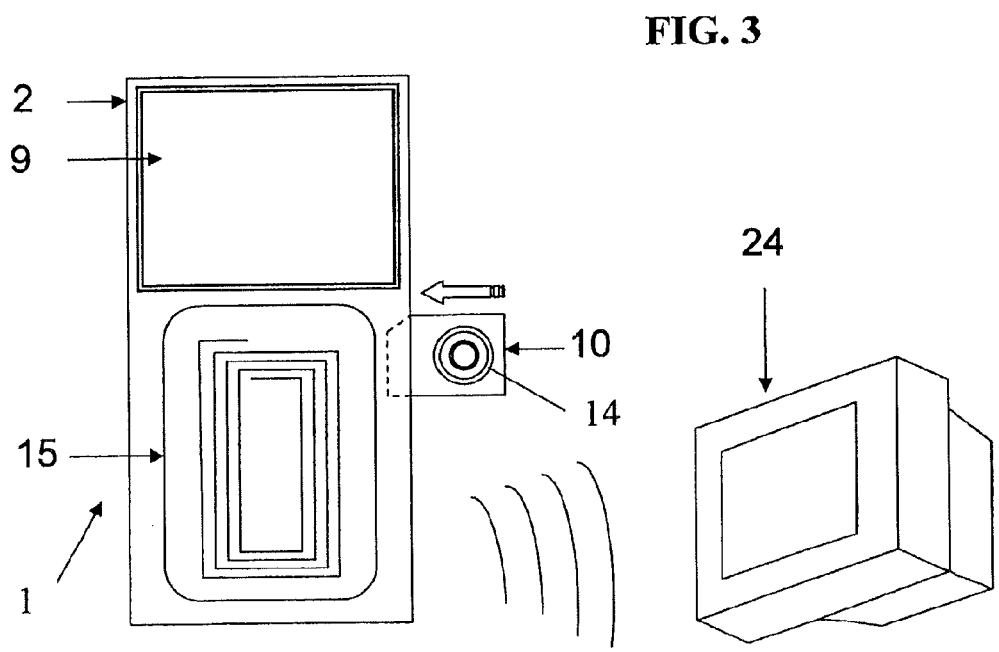
FIG. 3 illustrates a third embodiment of the invention.

In another embodiment shown in FIG. 3, the invention provides that the communication mobile substrate 1, more particularly as a "PDA" (Personal Data Assistant), includes no SIM card 11, and thus no telephone application, but simply includes a contactless smart card 10 provided with an antenna 14, so as to provide the radio frequency communication with the external terminal 24. Then again, depending on the position and the dimensions of the smart card 10 provided with an antenna, it may be advantageous or necessary to provide another antenna 15 of larger dimensions for amplifying the signal transmitted by the antenna 14.

The invention such as described, reached the goals aimed at and more particularly makes it possible, in some embodiments, to add a communication function, of the mobile telephone type as managed by a mobile telephone operator, to other contactless transactions executed with proximal terminals, and other operators such as, for example, banking or payment institutions.

The invention claimed is:

1. A communication mobile substrate, comprising:
a communication interface for communications between a first contactless smart card housed in the mobile communications substrate connected to a wireless communications network, and a contactless smart card reader, the interface comprising: a first antenna located on the contactless smart card; a second antenna integrated in the communication mobile substrate; and a third antenna, integrated in the communication mobile substrate and separate from the second antenna, configured to communicate with the wireless communications network; and
a slot and a receptacle for the introduction of a second contactless smart card, said second contactless smart card being positioned in the electromagnetic field of the second antenna and being able to receive and to execute an application program involving a communication with the contactless smart card reader through the second antenna,
wherein the first antenna and the second antenna are inductively coupled such that the first contactless smart card can communicate directly with the contactless smart card reader via the second antenna without using the third antenna or the wireless telecommunication network.

2. The communication interface according to claim 1, wherein the first contactless smart card is a double communication interface SIM card, having, on the one hand, electric contacts connected to matching contacts located in the communication mobile substrate, and having, on the other hand, said first antenna able to communicate through an inductive coupling with said second antenna integral with the communication mobile substrate.

3. The communication interface according to claim 2, wherein said communication mobile substrate is a mobile telephone compatible with the GSM standard or an equivalent.

4. The communication interface according to claim 3, wherein the second antenna is positioned on the body of the mobile telephone so as to face the first antenna positioned on the SIM card.

5. The communication mobile substrate according to claim 1, wherein said application program is a program for the payment of a service or a benefit, so that the communication substrate is able to make both mobile telephone transactions, using the SIM card and the wireless telecommunication network, and payment transactions using the second contactless smart card and the external smart card reader.

* * * * *